US009002554B2

(12) United States Patent
Chen

(10) Patent No.: US 9,002,554 B2
(45) Date of Patent: Apr. 7, 2015

(54) SMART PHONE APP-BASED REMOTE VEHICLE DIAGNOSTIC SYSTEM AND METHOD

(75) Inventor: Ieon C. Chen, Laguna Hills, CA (US)

(73) Assignee: Innova Electronics, Inc., Irvine, CA (US)

(*) Notice: Subject to any disclaimer, the term of this patent is extended or adjusted under 35 U.S.C. 154(b) by 33 days.

(21) Appl. No.: 13/467,884

(22) Filed: May 9, 2012

(65) Prior Publication Data

US 2013/0304278 A1 Nov. 14, 2013

(51) Int. Cl.
G06F 17/00 (2006.01)
G07C 5/00 (2006.01)

(52) U.S. Cl.
CPC .............. *G06F 17/00* (2013.01); *G07C 5/008* (2013.01)

(58) Field of Classification Search
USPC ...................... 701/1, 29.4; 340/901
See application file for complete search history.

(56) References Cited

U.S. PATENT DOCUMENTS

| D334,560 | S | 4/1993 | Wilson |
| 5,347,211 | A | 9/1994 | Jakubowski |
| D377,622 | S | 1/1997 | Chen |
| 5,635,841 | A | 6/1997 | Taylor |
| 5,767,681 | A | 6/1998 | Huang |
| 6,000,413 | A | 12/1999 | Chen |
| 6,145,083 | A * | 11/2000 | Shaffer et al. .............. 726/7 |
| 6,362,730 | B2 | 3/2002 | Razavi et al. |
| 6,499,385 | B2 | 12/2002 | Protti |
| 6,687,584 | B2 | 2/2004 | Andreasen |
| 6,868,369 | B2 | 3/2005 | Huang |
| 6,940,270 | B2 | 9/2005 | Chen |
| 6,941,203 | B2 | 9/2005 | Chen |
| 6,947,816 | B2 | 9/2005 | Chen |
| D510,287 | S | 10/2005 | Chen |
| 6,968,733 | B2 | 11/2005 | Andreasen |
| 7,030,742 | B2 | 4/2006 | Treadway |
| 7,085,680 | B2 | 8/2006 | Huang |
| 7,116,216 | B2 | 10/2006 | Andreasen |
| 7,209,813 | B2 | 4/2007 | Namaky |
| RE39,619 | E | 5/2007 | Andreasen |
| D545,223 | S | 6/2007 | Chen |
| D558,621 | S | 1/2008 | Rich |
| D559,137 | S | 1/2008 | Protti |

(Continued)

FOREIGN PATENT DOCUMENTS

DE 102011076768 A1 * 12/2012
EP 1926023 A2 * 5/2008

(Continued)

*Primary Examiner* — John R Olszewski
*Assistant Examiner* — Jean-Paul Cass

(57) ABSTRACT

Provided is a remote vehicle diagnostic system which utilizes a smart phone as a centralized communication hub between a vehicle and several remote resources. The system includes a program downloadable onto the smart phone to program the phone to perform desired functionality. The smart phone app may allow the smart phone to operate in a diagnostic mode and an emergency mode. In the diagnostic mode, the smart phone may relay vehicle data from the vehicle to a remote diagnostic center. The smart phone may also query the user to obtain symptomatic diagnostic information, which may be uploaded to the remote diagnostic center. In the emergency mode, the smart phone may be configured to upload critical information to a remote diagnostic center, or an emergency response center. The emergency mode may be triggered automatically in response to the vehicle being in an accident, or by user actuation.

26 Claims, 5 Drawing Sheets

(56) References Cited

U.S. PATENT DOCUMENTS

| | | | |
|---|---|---|---|
| D560,129 S | 1/2008 | Rich | |
| D560,527 S | 1/2008 | Rich | |
| 7,325,775 B2 | 2/2008 | Chen | |
| D563,249 S | 3/2008 | Chen | |
| D569,280 S | 5/2008 | Chen | |
| 7,376,497 B2 | 5/2008 | Chen | |
| D571,241 S | 6/2008 | Andreasen | |
| 7,437,227 B2 | 10/2008 | Andreasen | |
| D581,822 S | 12/2008 | Madison | |
| 7,463,959 B2 | 12/2008 | Namaky | |
| 7,464,000 B2 | 12/2008 | Huang | |
| D590,387 S | 4/2009 | Chen | |
| 7,520,668 B2 | 4/2009 | Chen | |
| RE40,798 E | 6/2009 | Chen | |
| RE40,799 E | 6/2009 | Chen | |
| 7,603,293 B2 | 10/2009 | Chenn | |
| 7,623,949 B2 | 11/2009 | Nou | |
| D610,586 S | 2/2010 | Chen | |
| 7,734,390 B2 | 6/2010 | Chen | |
| 7,751,953 B2 | 7/2010 | Namaky | |
| D624,446 S | 9/2010 | Chen | |
| D624,838 S | 10/2010 | Chen | |
| D625,209 S | 10/2010 | Chen | |
| D625,210 S | 10/2010 | Chen | |
| D625,634 S | 10/2010 | Chen | |
| 7,974,750 B2 | 7/2011 | Namaky | |
| 8,019,503 B2 | 9/2011 | Andreasen | |
| 8,024,083 B2 | 9/2011 | Chenn | |
| D646,188 S | 10/2011 | Chen | |
| D646,599 S | 10/2011 | Chen | |
| 8,032,419 B2 | 10/2011 | Chenn | |
| 8,055,403 B2 * | 11/2011 | Lowrey et al. | 701/31.5 |
| 8,068,951 B2 | 11/2011 | Chen et al. | |
| 8,131,419 B2 * | 3/2012 | Ampunan et al. | 701/31.4 |
| 8,180,379 B2 * | 5/2012 | Forstall et al. | 455/456.6 |
| 8,396,828 B2 * | 3/2013 | Ball et al. | 707/602 |
| 8,447,459 B2 * | 5/2013 | Lowrey et al. | 701/29.1 |
| 8,538,374 B1 * | 9/2013 | Haimo et al. | 455/404.2 |
| 8,543,287 B2 * | 9/2013 | Stevens et al. | 701/33.4 |
| 8,576,066 B2 * | 11/2013 | Bivens et al. | 340/539.13 |
| 8,626,568 B2 * | 1/2014 | Warkentin et al. | 705/7.38 |
| 8,635,091 B2 * | 1/2014 | Amigo et al. | 705/4 |
| 8,648,709 B2 * | 2/2014 | Gauger et al. | 340/539.1 |
| 8,682,699 B2 * | 3/2014 | Collins et al. | 705/4 |
| 8,694,556 B2 * | 4/2014 | Littooy et al. | 707/802 |
| 2002/0035486 A1 * | 3/2002 | Huyn et al. | 705/3 |
| 2005/0065813 A1 * | 3/2005 | Mishelevich et al. | 705/2 |
| 2005/0119016 A1 * | 6/2005 | Neumann | 455/466 |
| 2006/0123053 A1 * | 6/2006 | Scannell, Jr. | 707/104.1 |
| 2006/0252998 A1 * | 11/2006 | Kimbrell | 600/300 |
| 2007/0156311 A1 | 7/2007 | Elcock et al. | |
| 2008/0004764 A1 | 1/2008 | Chinnadurai | |
| 2008/0015748 A1 * | 1/2008 | Nagy | 701/33 |
| 2008/0074498 A1 * | 3/2008 | An | 348/207.1 |
| 2008/0082221 A1 * | 4/2008 | Nagy | 701/2 |
| 2008/0086240 A1 * | 4/2008 | Breed | 701/1 |
| 2008/0119981 A1 | 5/2008 | Chen | |
| 2008/0161988 A1 * | 7/2008 | Oesterling et al. | 701/29 |
| 2008/0249681 A1 | 10/2008 | Bertosa et al. | |
| 2009/0136006 A1 * | 5/2009 | Milton et al. | 379/45 |
| 2009/0276115 A1 | 11/2009 | Chen | |
| 2009/0326757 A1 | 12/2009 | Andreasen | |
| 2009/0326991 A1 * | 12/2009 | Wei et al. | 705/5 |
| 2010/0138242 A1 * | 6/2010 | Ferrick et al. | 705/4 |
| 2010/0157061 A1 * | 6/2010 | Katsman et al. | 348/149 |
| 2010/0174446 A1 | 7/2010 | Andreasen | |
| 2010/0235627 A1 | 9/2010 | Kerschbaum et al. | |
| 2010/0273445 A1 * | 10/2010 | Dunn et al. | 455/404.1 |
| 2010/0297980 A1 * | 11/2010 | Alberth et al. | 455/404.2 |
| 2011/0012720 A1 | 1/2011 | Hirschfeld | |
| 2011/0015998 A1 | 1/2011 | Hirschfeld | |
| 2011/0022248 A1 | 1/2011 | McQuade et al. | |
| 2011/0077028 A1 * | 3/2011 | Wilkes et al. | 455/456.3 |
| 2011/0087505 A1 * | 4/2011 | Terlep | 705/4 |
| 2011/0093278 A1 * | 4/2011 | Hutton | 705/2 |
| 2011/0106374 A1 * | 5/2011 | Margol et al. | 701/33 |
| 2011/0112717 A1 * | 5/2011 | Resner | 701/33 |
| 2011/0112932 A1 | 5/2011 | Chen | |
| 2011/0118934 A1 | 5/2011 | Lowrey et al. | |
| 2011/0123039 A1 | 5/2011 | Hirschfeld et al. | |
| 2011/0153367 A1 * | 6/2011 | Amigo et al. | 705/4 |
| 2011/0224866 A1 | 9/2011 | Chen | |
| 2011/0225096 A1 | 9/2011 | Cho et al. | |
| 2011/0264322 A1 | 10/2011 | Chen | |
| 2011/0313794 A1 * | 12/2011 | Feeney | 705/4 |
| 2012/0010775 A1 | 1/2012 | Chenn | |
| 2012/0011072 A1 * | 1/2012 | Lodolo | 705/302 |
| 2012/0146809 A1 * | 6/2012 | Oh et al. | 340/901 |
| 2012/0215491 A1 * | 8/2012 | Theriot et al. | 702/183 |
| 2012/0253551 A1 * | 10/2012 | Halimi et al. | 701/1 |
| 2012/0253607 A1 * | 10/2012 | Choi | 701/49 |
| 2013/0046432 A1 * | 2/2013 | Edwards et al. | 701/29.4 |
| 2013/0151064 A1 * | 6/2013 | Becker et al. | 701/31.4 |
| 2013/0304306 A1 * | 11/2013 | Selkirk et al. | 701/31.4 |

FOREIGN PATENT DOCUMENTS

| | | | |
|---|---|---|---|
| WO | WO 0026883 A2 * | 5/2000 | |
| WO | WO 2013074901 A2 * | 5/2013 | |

* cited by examiner

SMART PHONE APP-BASED REMOTE VEHICLE DIAGNOSTIC SYSTEM AND METHOD

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Technical Field of the Invention

The present invention relates to communication systems for automotive diagnostics, and more particularly, to communication systems for interfacing automotive diagnostic systems and remote diagnostic, repair and emergency services.

2. Description of the Related Art

Vehicle diagnostic systems have evolved in many ways to provide detailed information regarding the status of multiple vehicle systems. Such diagnostic systems may also be queried to output different information, as well as be programmed to modify vehicle operational parameters. As the sophistication of vehicle diagnostic systems grows, however, the requirements for supporting equipment can become more specialized, and the operational complexity of the supporting equipment may be beyond the level of ordinary consumers.

The increasing sophistication of vehicle diagnostic systems has also given rise to a variety of communication systems for interfacing the vehicle diagnostic system to wireless networks, for routing vehicle owners to service providers, the internet and elsewhere. Business models for various automatic systems have emerged, based on different commercial approaches for interfacing communication networks to vehicle voice and data systems.

One such contemporary business model is exemplified by the OnStar™ system, operated by General Motors Corporation. The system typically includes a wireless appliance installed in the vehicle, wired to the vehicle diagnostic system. The wireless appliance may include, or be wired to a global position satellite (GPS) system, for generating information respecting the location of the vehicle. OnStar™ system also allows remote operation of certain vehicle systems, e.g. unlocking the doors. The OnStar™ service is typically provided on a subscription basis, with the first year being free of charge with the purchase of qualifying vehicles, i.e. typically higher priced vehicles.

Another wireless vehicle system of note is the LoJack™ system for protecting vehicle theft conditions, and monitoring the location of the vehicle in the event that it is stolen or lost. Like the OnStar™ system, the LoJack™ system utilizes a wireless appliance that incorporates a GPS system, communicates to a dedicated receiver, and charges a subscription fee to maintain and support the data link.

While dedicated communication links such as those utilized in the OnStar™ system and the LoJack™ system, can provide useful diagnostic services and security in relation to a variety of circumstances, such systems suffer from a variety of practical and economic factors that tend to limit their use and customer base.

A common shortcoming of such contemporary systems is that they typically require dedicated hardware, e.g. a wireless appliance mounted to a vehicle, and electrically connected to the vehicle computer. Such hardware is typically installed by a trained installer or by original car manufacturer. Moreover, the hardware relies upon a dedicated wireless communication link to a specific service provider. Consequently, the user may feel captive to a particular diagnostic subscription service. Such systems may be viewed as expensive, of limited functionality, and tend to be standard equipment only in higher priced vehicles.

Given the rapid evolution of cellphones, and the proliferation of multiservice cellular telephone networks, the need for accessing a diagnostic system communications link may be better served by cellphones, and which allow a broader choice of contacts. In relation to conventional prior art systems, it would be desirable to provide a diagnostic communication system that does not require mounting to a vehicle chassis, or need installation by a trained installer.

It is desirable to provide a diagnostic communication system that does not require a dedicated communications link, but rather allows a user to connect to a variety of generally available contacts on the cellular network, public telephone network and the internet, without the need for participation in a subscription communication service.

It is further desirable to provide a diagnostic communication system that is installable, removable, hand transportable and connectable to different vehicles, without the need for trained assistance or service registration.

It is also desirable to provide a hand transportable diagnostic communication system that allows for internal storage of vehicle diagnostic information, and transfer of the information, wirelessly and/or manually, to a general purpose computer. Such manual data transport would allow for storage and communication of data to a remote service provider, even when communication via cellular telephone network or local connectivity circuit is unavailable.

As described below, the present invention, in different combination embodiments, addresses these and other improvements to contemporary vehicle diagnostic communication systems, and business methods related thereto.

BRIEF SUMMARY OF THE INVENTION

There is provided a remote vehicle diagnostic system which utilizes a smart phone as a centralized communication hub between a vehicle and several remote resources. The system may include a program or "app" downloadable on the smart phone to program the phone to perform the desired functionality. The smart phone app may allow the smart phone to operate in several different modes, including a diagnostic mode and an emergency mode. In the diagnostic mode, the smart phone may relay vehicle data from the vehicle to a remote diagnostic center. The smart phone may also query the user to obtain symptomatic diagnostic information, which may also be uploaded to the remote diagnostic center. In the emergency mode, the smart phone may be configured to upload critical information to a remote diagnostic center, as well as an emergency response center. The emergency mode may be triggered automatically in response to the vehicle being in an accident, or alternatively, by user actuation.

According to one embodiment, there is provided an automotive diagnostic system for use with a remote diagnostic center, a smart phone, and a vehicle having an onboard vehicle computer which generates and stores vehicle data, which may include at least one diagnostic trouble code (DTC) generated in response to a problematic operating condition and an accident indicator generated in response to an vehicle accident event. The automotive diagnostic system includes a data storage unit connectable with the onboard vehicle computer for retrieving vehicle data from the onboard vehicle computer and storing the vehicle data. The data storage unit is configured to generate a first emergency initiation signal in response to receipt of the accident indicator. The automotive diagnostic system further includes a computer readable medium downloadable onto the smart phone for configuring the smart phone to communicate with the data storage unit, receive a second emergency initiation signal from the user, and operate in a diagnostic mode and an emergency mode. In the diagnostic mode, the smart phone uploads vehicle data to the remote diagnostic center when the vehicle data includes at least one DTC, and initiates a symptomatic question sequence for the user when the vehicle data does not include at least one DTC. In the emergency mode, the smart phone uploads vehicle data to the remote diagnostic center automatically in response to receipt of one of the first and second emergency initiation signals.

The present invention is best understood by reference to the following detailed description when read in conjunction with the accompanying drawings.

BRIEF DESCRIPTION OF THE DRAWINGS

These as well as other features of the present invention will become more apparent upon reference to the drawings wherein.

Common reference numerals are used throughout the drawings and detailed description to indicate like elements.

DETAILED DESCRIPTION OF THE INVENTION

Figure 1:
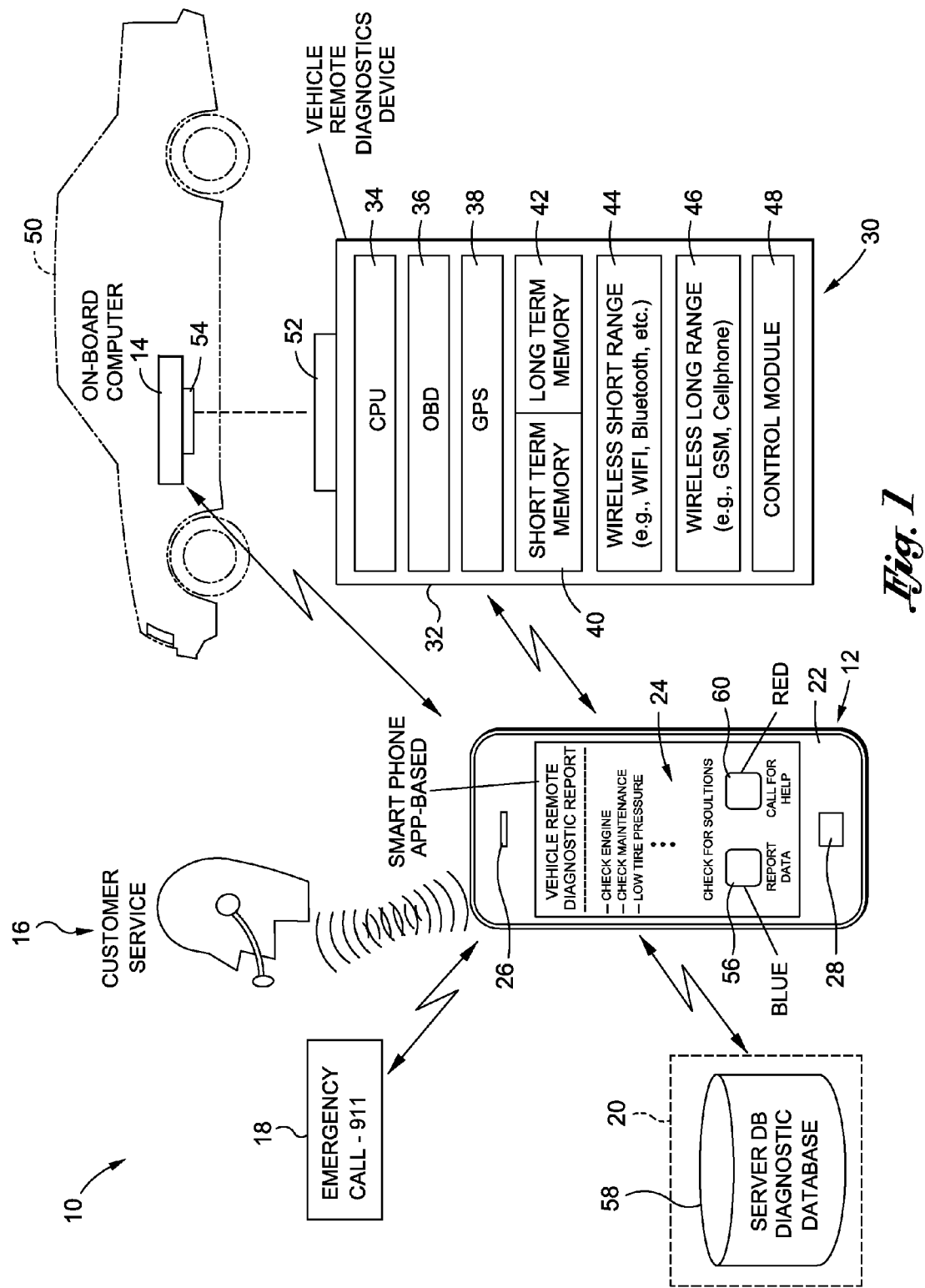
FIG. 1 is a schematic overview of an embodiment of a smart phone based vehicle remote diagnostic system.

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Referring now to the drawings, wherein the showings are for the purpose of illustrating a preferred embodiment of the present invention only, and are not for purpose of limiting the same, there is shown an automotive diagnostic system 10 which utilizes a smart phone 12 as a centralized diagnostic information hub to organize and communicate information between various remote diagnostic resources. In this regard, the smart phone 12 may communicate with a vehicle's on-board computer 14, the driver of the vehicle, and remote resources, such as a customer service center 16, an emergency response center 18, or diagnostic database 20. The smart phone 12 may include software, i.e. a "smart phone app," or other computer readable instructions or medium operative to configure the smart phone 12 for interfacing with the various remote diagnostic resources, prompting various commands/requests and displaying diagnostic information for the user.

The smart phone app is operative to configure the smart phone 12 to operate in one of several modes, including but not limited to a diagnostic mode and an emergency mode. The smart phone 12 may begin operation in one of the various modes according to user input, or based on information received from the on-board computer 14.

Figure 2:
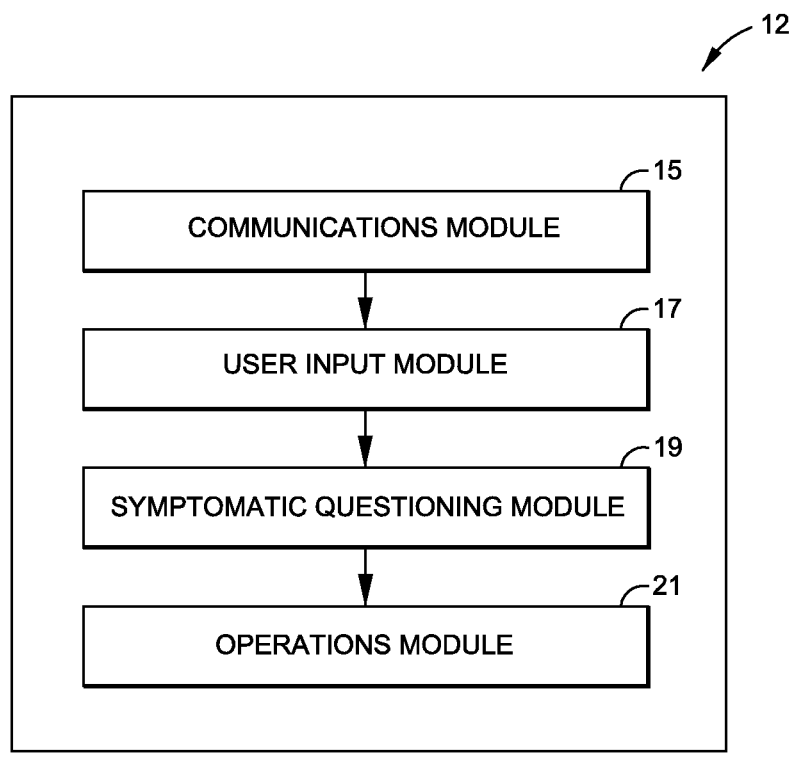
FIG. 2 is a schematic diagram of various modules which may be implemented in the smart phone.

FIG. 2 shows a schematic view of the various modules implemented into the smart phone 12 to perform the various functions described herein. The various modules shown in FIG. 2 include a communications module 15, a user input module 17, a symptomatic questioning module 19 and an operations module 21. According to one embodiment, the modules 15, 17, 19, 21 are downloadable onto the smart phone 12 via the app or other computer program.

The smart phone 12 depicted in FIG. 1 includes a housing 22, a touch screen display 24, a speaker 26, and input button 28. As used herein, a "smart phone" is a mobile phone built on a mobile computing platform, which typically includes more advance computing ability and conductivity then a standard mobile phone. Exemplary smart phones 12 include the iPhone™ by Apple™, the Droid™ by Motorola™, the Galaxy Nexus™ by Samsung™, and the Blackberry Curve™. It is also contemplated that the term "smart phone" may also include tablet computers such as the Apple iPad™, or other portable electronic devices, such as the iPod Touch™, PDAs, or other portable electric devices currently known or later developed by those skilled in the art.

According to one embodiment, the smart phone 12 interfaces with the on-board computer 14 via a data storage unit 30 which is connectable to the on-board vehicle computer 14 to retrieve and store vehicle data therefrom. As shown in FIG. 1, the data storage unit 30 is a separate device, which plugs into the standard OBD-II connector on an OBD-II compliant vehicle. The data storage unit 30 includes a housing 32 which houses a central processing unit 34 (CPU), an OBD protocol database 36, a GPS device 38, a short term memory 40, a long term memory 42, a wireless short range communication circuit 44, a wireless long range communication circuit 46, and a control module 48. The CPU 34 is configured to facilitate the processing of the functions performed by the data storage unit 30, such as data processing, signal transmission and reception, data storage, data deletion, etc. The OBD protocol database 36 is configured to poll the on-board computer 14 when the data storage unit 30 is connected the vehicle 50 to determine the particular protocol utilized by the on-board computer 14. In this regard, the OBD protocol database 36 may include several protocols which are sequenced through upon connection to the on-board computer 14.

During the operation of the vehicle 50, vehicle data is generated by sensors and computers located throughout the vehicle 50. This vehicle data may correspond to operational data (i.e., vehicle speeds, rpms, oxygen sensor, etc.), diagnostic trouble codes (DTC), MIL status, freeze frame data, monitor status, etc. The data storage unit 30 connects to the on-board computer 14 via a first connector 52 located on the data storage unit 30 and a second connector 54 located on the vehicle on-board computer 14 to receive the vehicle data from the on-board vehicle computer 14. As indicated above, the second connector 54 may be a standard OBD II type plug-in connector. In this regard, the first and second connectors 52, 54 may physically engage to facilitate communication between the on-board computer 14 and the data storage unit 30. It is also contemplated that the data storage unit 30 may be wirelessly synced with the on-board computer 14 to allow for wireless communication therebetween. In this regard, various short ranged communication protocols, such as Bluetooth™, Infrared, RF, or other short range communication technologies may be used to facilitate such short range communication.

Figure 3:
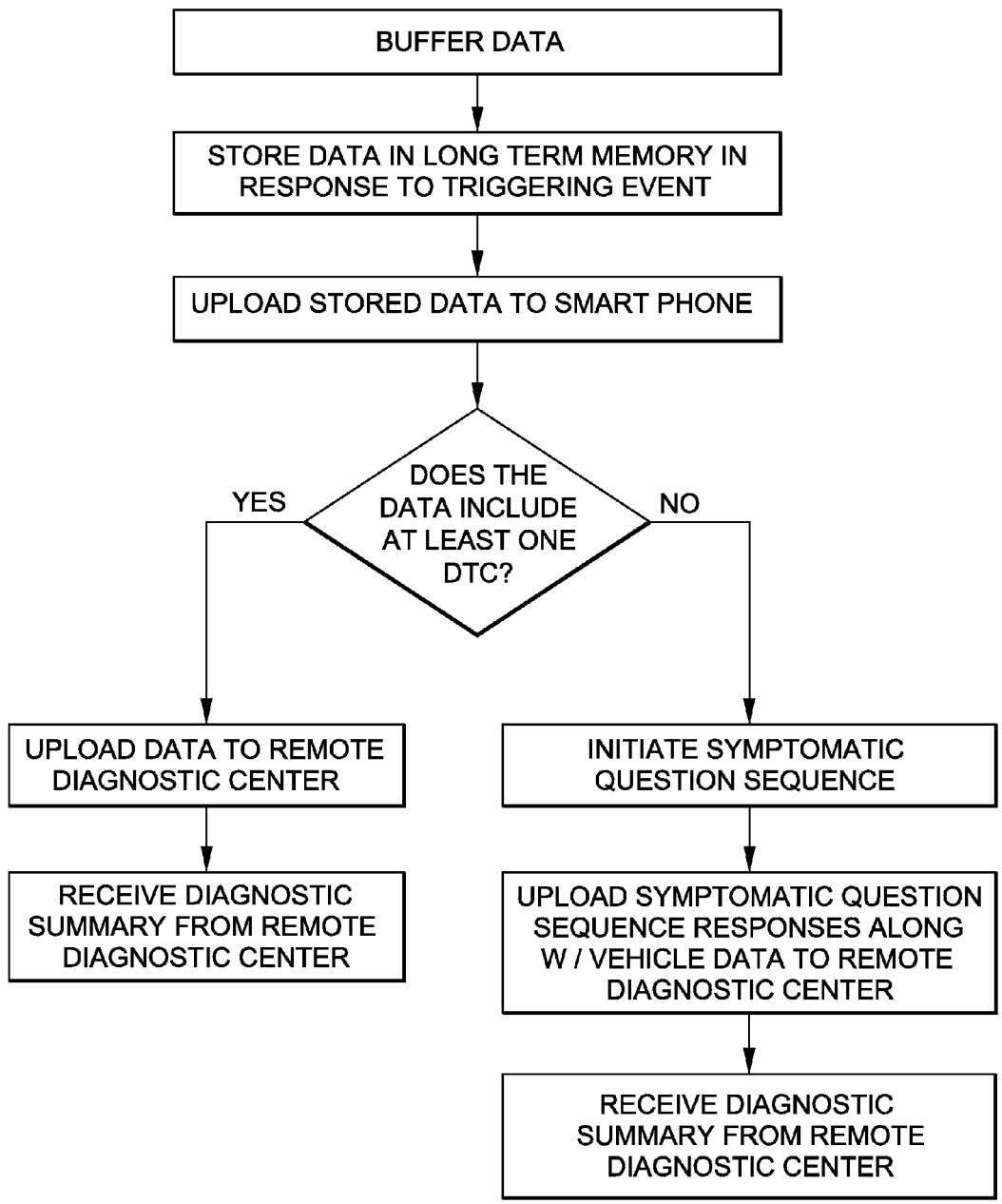
FIG. 3 is an overview of an embodiment of a diagnostic operating mode.
Figure 4:
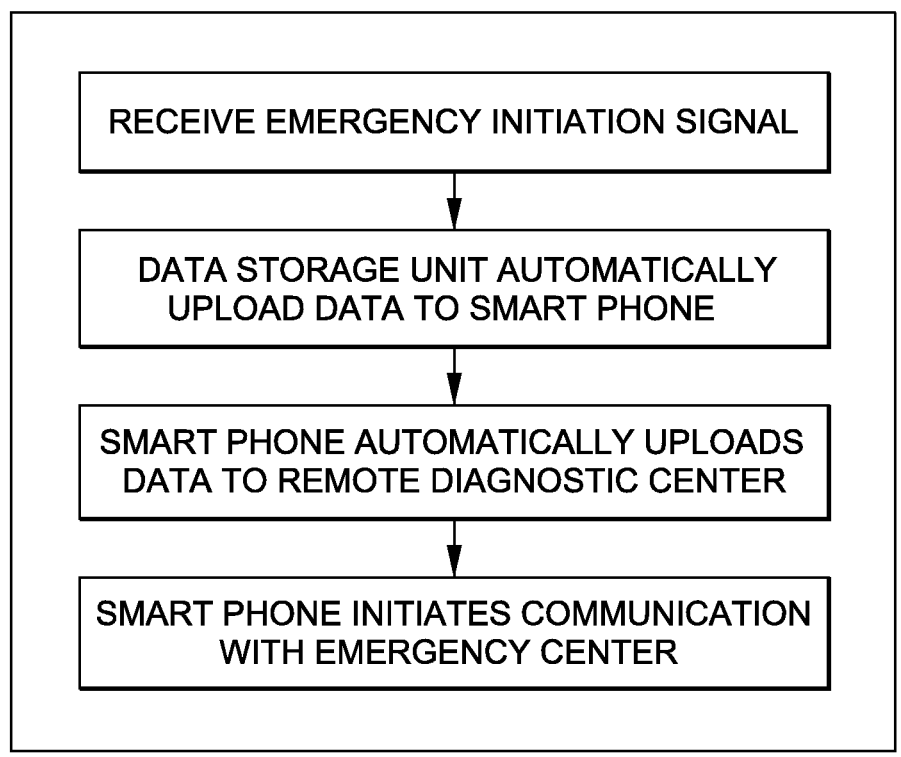
FIG. 4 is an overview of an embodiment of an emergency operating mode.

The software located on the smart phone 12 may allow the smart phone 12 to operate in several different operational modes, including a diagnostic mode (See FIG. 3) and an emergency mode (See FIG. 4). Generally speaking, when the smart phone 12 is in the diagnostic mode, the smart phone 12 automatically uploads vehicle data to the remote diagnostic center 20 when the vehicle data includes at least one DTC, and initiates a symptomatic question sequence for the user when the vehicle data does not include at least one DTC. When the smart phone 12 is in the emergency mode, the smart phone 12 initiates communication with an emergency response center (i.e., telephone call, text message, email, etc), and uploads vehicle data to a remote diagnostic center 20 automatically in response to receipt of an emergency initiation signal.

As set forth in more detail below, the smart phone 12 may switch between the various modes according to prompting by the user, or according to information received from the data storage unit 30. The operation of the remote diagnostic system will now be described to more specifically describe the various operational modes of the smart phone 12.

An overview of the diagnostic mode is depicted in FIG. 3. As noted above, operation of the vehicle 50 generates vehicle data. That vehicle data is stored on the onboard vehicle computer 14 and retrieved from the data storage unit 30. The data storage unit 30 may be programmed to buffer the data in the short term memory 40 and only store data in the long term memory 42 in response to a triggering event. Such a triggering event may be a routine occurrence, such as placing the vehicle in park or turning the vehicle off, or may be a more problematic occurrence, such as receiving a DTC or some other indication of a diagnostic condition.

The user may selectively initiate the diagnostic mode by requesting that data stored on the data stored unit 30 be uploaded to the smart phone 12. The smart phone 12 may include a first button 56 which may be pressed/selected to request the data from the data storage unit 30. As shown in FIG. 1, the smart phone 12 includes a touch screen display with a "BLUE" button representing the first button 56, such that the user may select the BLUE button to request data from the data storage unit 30.

When the user selects the first button 56, the smart phone 12 generates a data request signal which is then transmitted by the smart phone 12 and received by the data storage unit 30. The data storage unit 30 is configured to process the data request signal and generate a responsive data transfer signal including the data requested by the smart phone 12. The data included in the data transfer signal may include data from the short term memory 40, the long term memory 42, or a combination thereof, although in most circumstances, the data requested by the user will generally correspond to the data in the long term memory 42.

After the vehicle data is received by the smart phone 12, the vehicle data is processed to determine the appropriate actions to take. According to one embodiment, if the vehicle data includes at least one DTC, the smart phone 12 may be configured to automatically transfer the vehicle data to the remote diagnostic center 20 for further analysis. The remote diagnostic center 20 may include a diagnostic database 58 which the vehicle data is matched with to determine a possible diagnostic solution. For more information related to processing of diagnostic data using a diagnostic database, please refer to U.S. Patent Application Publication No. 2010/0174446, entitled, Automotive Diagnostic Process, and U.S. Pat. No. 8,068,951, entitled Vehicle Diagnostic System, both of which are owned by Innova Electronics Corp., which also owns the present application, the contents of which are incorporated herein by reference.

If the vehicle data does not include at least one DTC, the smart phone 12 may initiate a symptomatic question sequence to query the user as to the diagnostic symptoms the user is experiencing. The symptomatic question sequence may include a comprehensive, multi-level series of questions which become more specific based on the user's answers. In this regard, the smart phone app may include a database of symptomatic questions which is accessed at this point in the diagnostic process.

The symptomatic question sequence may begin with simple, closed-ended questions presented in a multiple choice format. For instance, a general question which may be initially asked to the user may be: "What appears to be the nature of the problem? A) Mechanical or B) Electrical." If the user selects "A) Mechanical," a series of follow up questions may include, "What type of symptom(s) are you experiencing? A) Irregular Smell, B) Irregular Sound, C) Irregular Sight (i.e., smoke), D) Irregular Feel (i.e., vibration)." "Where is the irregular sound coming from? A) Front-Driver's Side, B) Front-Passenger's Side, C) Rear-Driver's Side, D) Rear-Passenger's Side." "When do you hear the sound? A) When the car is in park, B) When the car is moving." "Does the sound occur when you press the brakes? A) Yes, B) No." Those skilled in the art will readily appreciate that the questions presented above are exemplary in nature only and are not intended to limit the scope of the present invention.

The answers selected by the user may be stored in the smart phone 12 and then uploaded to the remote diagnostic center 20. The answers may be matched with databases at the remote diagnostic center 20 and/or may be reviewed by diagnostic personnel, i.e., mechanics, to determine a possible diagnostic solution.

After the remote diagnostic center 20 processes the data sent from the smart phone 12, whether it is actual vehicle data or symptomatic data entered by the user, the remote diagnostic center 20 sends a signal back to the smart phone 12, wherein the signal includes the possible diagnostic solution. Once received, the smart phone 12 may display the possible diagnostic solution, as well as the underlying data or a diagnostic summary. For instance, the data displayed may include the raw data, the DTC(s), DTC descriptor(s), or a diagnostic summary.

It is contemplated that the display of diagnostic information is not predicated on receipt of the possible diagnostic solution from the remote diagnostic center 20. Rather, certain diagnostic data may be displayed after receiving the vehicle data from the data storage unit 30. Along these lines, the smart phone app may be capable of performing a small amount of diagnostic processing to generate an initial diagnostic summary. For instance, the smart phone app may be capable of display DTC descriptors for DTCs received from the data storage unit 30.

With the diagnostic mode being described, attention is now directed to the emergency mode, with a general overview thereof being depicted in FIG. 4. The emergency mode may be initiated on the smart phone 12 upon receipt of an emergency initiation signal. When the smart phone 12 is in the emergency mode, the smart phone 12 automatically uploads vehicle data to the remote diagnostic center 20 upon receiving the emergency initiation signal.

It is contemplated that the emergency initiation signal may be triggered by the vehicle 50 or by the user. For instance, many vehicles are equipped with a Supplemental Restraint System (SRS) which include airbags configured to deploy in the event of an accident to cushion the impact to the passengers. When the SRS detects a significant impact, an SRS signal is generated to deploy the airbags. The SRS signal may be retrieved by the data storage unit 30 to indicate the presence of an emergency situation. In this regard, the SRS signal may cause the data storage unit 30 to generate a first emergency initiation signal and prompt the data storage unit 30 to upload vehicle data to the smart phone 12.

Receipt of the first emergency initiation signal will cause the smart phone 12 to operate in the emergency mode. When the smart phone 12 is in the emergency mode, the smart phone 12 communicates critical data to the remote diagnostic center 20 to preserve the data and to facilitate emergency response. In this regard, the smart phone 12 may not only communicate vehicle data to the remote diagnostic center 20, the smart phone 12 may also communicate GPS data or other data stored on the phone 12 or accessible by the phone 12.

The smart phone 12 may also be configured to initiate a phone call with the emergency response center 18 when the phone 12 enters the emergency mode. In other words, the smart phone 12 may place a phone call to the emergency response center 18 when the first emergency initiation signal is received by the smart phone 12.

The initiation of the phone call alerts the emergency response center 18 that the user has been in an accident and also allows the emergency response center 18 to hear what is happening. Therefore, if as a consequence of the accident, the driver is lodged in the vehicle 50 and cannot move, the driver merely has to speak to communicate with the personnel at the emergency response center 18. No affirmative actions need to be taken by the driver to make the call when the phone 12 is operating in the emergency mode. Therefore, the emergency mode provides a level of assurance that critical information will be communicated to emergency response personnel and that the appropriate resources will be dispatched in the event of an accident. For instance, the emergency response center 18 may dispatch roadside service, towing, medical response teams, etc.

Although the foregoing describes the emergency mode being initiated in response to data received from the vehicle 50, it is also contemplated that the emergency mode may be initiated in response to user input into the smart phone 12. For instance, the smart phone 12 may include an emergency mode button 60 which the user may press/actuate to place the phone 12 in the emergency mode. When the user presses the emergency mode button 60, a signal is sent to the data storage unit 30 to upload data to the smart phone 12. When the smart phone 12 receives the data, the smart phone 12 automatically uploads the data to the remote diagnostic center 20, as explained above. In addition, the smart phone 12 also initiates a telephone call with the emergency response center 18, as described above.

The user actuated initiation of the emergency mode may be useful when the user is experiencing an emergency that is not related to the vehicle 50. For instance, if the driver or one of the passengers is experiencing an emergency medical condition, the emergency mode may be used to communicate critical data (i.e., GPS data) to a remote location, as well as initiate an emergency phone call in a single action (i.e., pressing the emergency mode button 60).

The emergency mode button 60 may also be used as a "panic" button to actuate the alarm system on the vehicle 50. More specifically, if the user presses and holds the emergency mode button 60, a panic signal may be sent from the smart phone 12 to the data storage unit 30, and then to the vehicle 50. The data storage unit 30 may be able to translate the panic signal sent from the smart phone 12 into a language or protocol understood by the vehicle 50, such that when the vehicle 50 receives the modulated panic signal from the data storage unit 30, the alarm is actuated.

It is important to distinguish the difference between merely pressing the emergency mode button 60 and pressing and holding the emergency mode button 60. When the button 60 is simply pressed, i.e., the user quickly releases his finger shortly after pressing the button 60, the emergency mode is started without triggering the panic signal. However, when the button 60 is pressed and held, i.e., the user continues to apply pressure on the button 60 for a longer period of time when the button 60 is pressed or actuated, which generates the panic signal. For instance, the phone 12 may be configured such that the user must press and hold the button 60 for more than one second to initiate the panic signal.

Although the foregoing describes the diagnostic system as including a separate, plug-connectable data storage unit 30, it is expressly contemplated that other embodiments of the invention may include a data storage unit integrated into the vehicle 50. For instance, the on-board computer 14 may be configured to perform all of the functionality of the data storage unit 30 described above, including data buffering and storage, GPS location identification, short range communication, long range communication, data processing, etc. In this regard, the smart phone 12 may communicate directly with the on-board computer 14 via short range communication means, such as Bluetooth™, infra-red communication or other wireless communication means. It is also contemplated that the smart phone 12 may communication via direct, hard wired communication.

The foregoing expressly contemplates utilizing the smart phone 12 as a communication hub between the vehicle 50, a remote diagnostic database 20, an emergency response center 18, and other remote locations/resources. It is additionally contemplated that in other embodiments of the present invention, the smart phone 12 may be utilized to control one or more systems on the vehicle 50. For instance, the smart phone 12 may be capable of sending a signal to the vehicle 50, specifically the on-board computer/ECU 14 to remotely start the engine, lock/unlock the door(s), open the trunk, etc.

Figure 5:
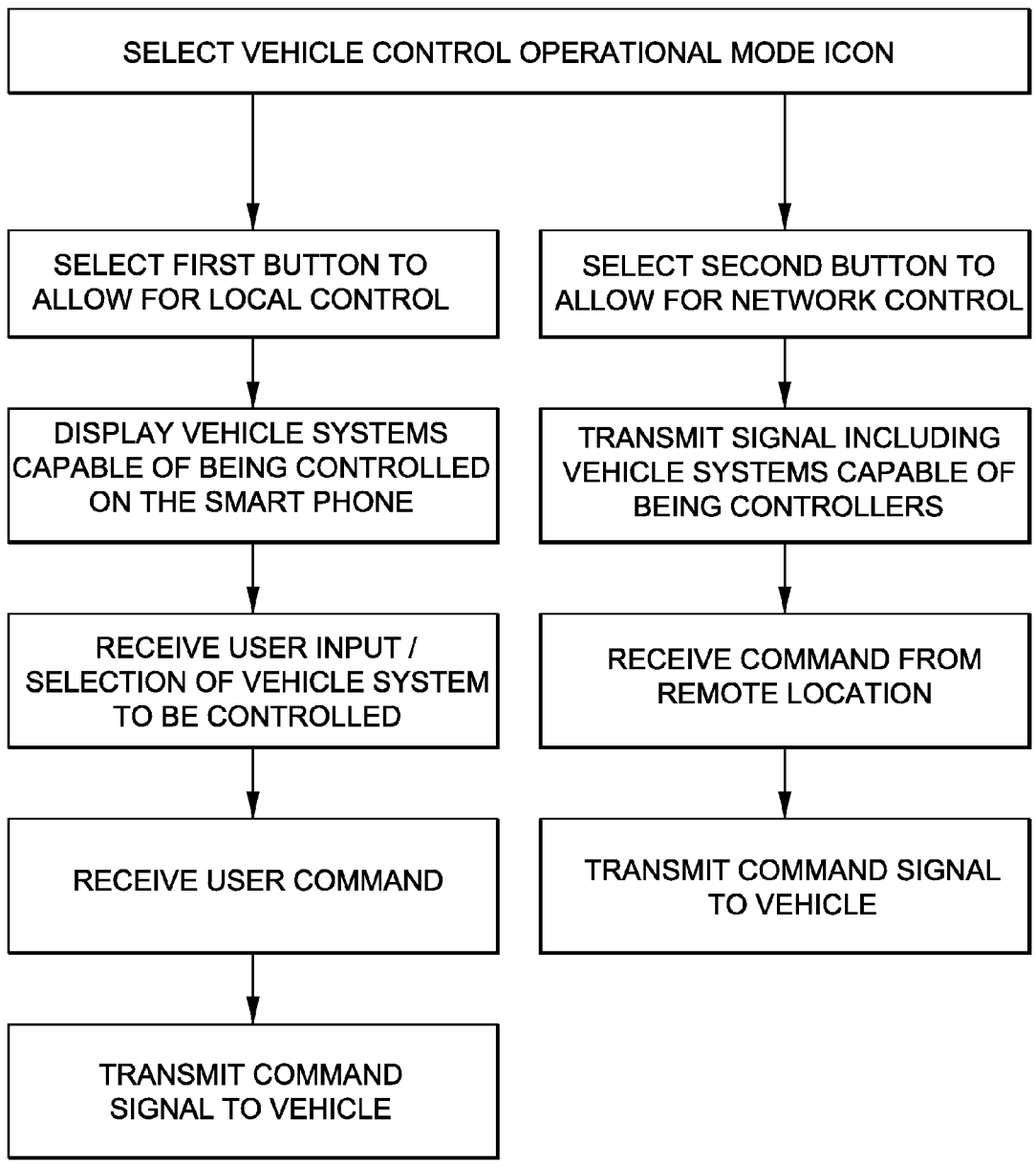
FIG. 5 is an overview of an embodiment of a vehicle control operational mode.

The smart phone 12 may include one or more dedicated buttons for enabling local control (i.e., control by the operator of the smart phone 12) of the vehicle 50, or remote control (i.e., control from a remote location, such as a customer service center) of the vehicle 50. The buttons 56, 60 shown in FIG. 1 may be used in a vehicle control operational mode, as opposed to a diagnostic operational mode discussed above, to enable control over vehicle systems. FIG. 5 provides an overview of an embodiment of the vehicle control operating mode. Each mode may include a dedicated icon which may be displayed on the smart phone display 24. The user may selectively switch between the vehicle control operational mode and the diagnostic operational mode by selecting the associated icon or button on the smart phone 12.

The first button (blue button) 56 may be used to allow a user to control one or more vehicle systems. The smart phone 12 may display on the display screen 24 one or more vehicle systems capable of being controlled by the smart phone 12. The user may select the specific one of the vehicle systems which the user wants to control and then press the first button to effectuate the desired functionality. For instance, the smart phone 12 may provide a list of options including: START ENGINE, UNLOCK DOOR, LOCK DOOR, OPEN TRUNK, CLOSE TRUNK, TEMPERATURE CONTROL, and RADIO CONTROL. The user may select one of the options and then press the first button 56, which in turn generates a command signal that is transmitted to the vehicle. It is contemplated that the command signal may be communicated directly to the on-board computer 14, or alternatively transmitted to the data storage unit 30, which then sends to the command signal to the on-board computer 14. In some cases, the user may have to make more than one selection on the display screen 24, depending on the selected option. For instance, if the user selects TEMPERATURE CONTROL, the display screen 24 may then list several temperatures which the user then selects. After the final temperature is selected, the user then presses the first button 56 to send the command to the vehicle 50. Thus, it is contemplated that several selections may be made before the command is sent to the vehicle 50, or alternatively, a single selection may be made before the command is sent to the vehicle 50.

The second button 60 may be actuated by the user to enable control of the vehicle 50 from a remote location. When the second button 60 is actuated, the smart phone 12 establishes communication with a customer service center 16, such as through a telephone call, email, text message, etc. The personnel at the customer service center 16 obtains information from the user and determines the appropriate action to take. For instance, if the vehicle 50 is in an accident, the user may actuate the second button 60 to contact the customer service center 16 to request that the vehicle be turned off. The customer service center 16 may then transmit a command signal to the smart phone 12, which is then communicated to the vehicle 50.

Additional modifications and improvements of the present invention may also be apparent to those of ordinary skill in the art. Thus, the particular combination of components and steps described and illustrated herein is intended to represent only certain embodiments of the present invention, and is not intended to serve as limitations of alternative devices and methods within the spirit and scope of the invention.

What is claimed is:

1. An automotive diagnostic system for use with a remote diagnostic center, a smart phone, and a vehicle, wherein the smart phone is capable of operating independent of the vehicle, the vehicle having an onboard vehicle computer which generates and stores vehicle data including at least one diagnostic trouble code (DTC) generated in response to a problematic operating condition and an accident indicator generated in response to a vehicle accident event, the automotive diagnostic system comprising:

a data storage unit plug connectable with the vehicle to communicate with the onboard vehicle computer for retrieving vehicle data from the onboard vehicle computer and storing the vehicle data, the data storage unit being configured to analyze the retrieved vehicle data on the data storage unit and generate a first emergency initiation signal in response to receipt of the accident indicator; and computer readable instructions downloadable onto the smart phone for configuring the smart phone to:
communicate with the data storage unit;
receive a second emergency initiation signal from the user;
operate in a diagnostic mode and an emergency mode;
in the diagnostic mode, the smart phone uploads vehicle data to the remote diagnostic center in response to the vehicle data including at least one DTC, and initiates a symptomatic question sequence for the user in response to the vehicle data not including at least one DTC;
in the emergency mode, the smart phone uploads vehicle data to the remote diagnostic center automatically in response to receipt of one of the first and second emergency initiation signals;
assign a diagnostic mode button and an emergency mode button, such that when the diagnostic mode button is activated by the user, the smart phone enters the diagnostic mode, and when the emergency mode button is activated by the user, the second initiation signal is generated; and
wherein the symptomatic question sequence for the user in the diagnostic mode comprises a plurality of closed-ended questions presented in a multiple choice format, and wherein the multiple choice answers further include follow up questions, and wherein the questions are selected from at least three questions to formulate a diagnostic of the group consisting of:
1. what appears to be the nature of the problem?
   a) mechanical; or
   b) electrical
2. what type of symptom(s) are you experiencing?
   a) irregular smell;
   b) irregular sound;
   c) irregular sight, smoke; or
   d) irregular feel, vibration
3. where is the irregular sound coming from?
   a) front-driver's side;
   b) front-passenger's side;
   c) rear-driver's side or
   d) rear-passenger's side
4. When do you hear the sound?
   a) when the car is parked; or
   b) when the car is moving and
5. Does the sound occur when you press the brake?
   a) yes; or
   b) no.

2. The automotive diagnostic system recited in claim 1, wherein the data storage unit includes a buffer memory module and a long-term memory module, the buffer memory module being configured to temporarily store vehicle data therein for a prescribed buffer period, the data storage unit being configured to transfer the data from the buffer memory module to the long-term memory module for long-term storage.

3. The automotive diagnostic system recited in claim 2, wherein the data storage unit transfers vehicle data from the buffer memory module to the long-term memory module in response to receipt of the accident indicator.

4. The automotive diagnostic system recited in claim 2, wherein the computer readable instructions configure the smart phone to enable programming of the duration of the buffer period.

5. The automotive diagnostic system recited in claim 1, wherein in the diagnostic mode, the smart phone sends a data request signal to the data storage unit.

6. The automotive diagnostic system recited in claim 1, wherein the data storage unit is configured to wirelessly communicate with the smart phone.

7. The automotive diagnostic system recited in claim 1, wherein the symptomatic question sequence includes a plurality symptomatic questions displayed on the smart phone display screen.

8. The automotive diagnostic system recited in claim 7, wherein the smart phone is configured to receive symptomatic user input in response to displaying the plurality of symptomatic questions on the smart phone display screen.

9. The automotive diagnostic system recited in claim 8, wherein the smart phone is configured to upload the symptomatic user input to the remote diagnostic center.

10. The automotive diagnostic system recited in claim 1, wherein at least one of the diagnostic mode button and emergency mode button is a touch screen button.

11. The automotive diagnostic system recited in claim 1, wherein the smart phone, in the emergency mode, is configured to automatically initiate a telephone call with the remote diagnostic center in response to receipt of one of the first and second emergency initiation signals.

12. The automotive diagnostic system recited in claim 1, wherein:
- the computer readable instructions program the smart phone to receive a user alarm input and transmit an alarm signal to the data storage unit in response to receiving the user alarm input; and
- the data storage unit is configured to transmit a vehicle alarm signal to the onboard computer to activate the vehicle alarm.

13. The automotive diagnostic system recited in claim 12, wherein the user alarm input includes the user pressing and holding an emergency mode button on the smart phone.

14. The automotive diagnostic system recited in claim 1, wherein the computer readable instructions further configure the smart phone to generate and send a message to an emergency contact in response to receipt of one of the first and second emergency initiation signals.

15. An automotive diagnostic system for use with a remote diagnostic center, a smart phone, and a vehicle, the smart phone being capable of operating independent of the vehicle, the vehicle having an onboard vehicle computer which generates and stores vehicle data including at least one diagnostic trouble code (DTC) generated in response to a problematic operating condition and an accident indicator generated in response to an vehicle accident event, the automotive diagnostic system comprising:
- computer readable instructions downloadable onto the smart phone for configuring the smart phone to:
  - communicate with the onboard vehicle computer;
  - receive a second emergency initiation signal from the user; and
  - operate in a diagnostic mode and an emergency mode;
    - in the diagnostic mode, the smart phone automatically uploads vehicle data to the remote diagnostic center in response to the vehicle data including at least one DTC, and automatically accesses a symptomatic question database remote from the vehicle computer for initiating a symptomatic question sequence for the user in response to the vehicle data not including at least one DTC;
    - in the emergency mode, the smart phone uploads vehicle data to the remote diagnostic center automatically in response to receipt of one of the first and second emergency initiation signals; and
  - wherein the symptomatic question sequence for the user in the diagnostic mode comprises a plurality of closed-ended questions presented in a multiple choice format, and wherein the multiple choice answers further include follow up questions, and wherein the questions are selected from at least three questions to formulate a diagnostic of the group consisting of:
    1. what appears to be the nature of the problem?
       a) mechanical; or
       b) electrical
    2. what type of symptom(s) are you experiencing?
       a) irregular smell;
       b) irregular sound;
       c) irregular sight, smoke; or
       d) irregular feel, vibration
    3. where is the irregular sound coming from?
       a) front-driver's side;
       b) front-passenger's side;
       c) rear-driver's side or
       d) rear-passenger's side
    4. When do you hear the sound?
       a) when the car is parked; or
       b) when the car is moving and
    5. Does the sound occur when you press the brake?
       a) yes; or
       b) no.

16. The automotive diagnostic system recited in claim 15, wherein the symptomatic question sequence includes a plurality symptomatic questions displayed on the smart phone display screen.

17. The automotive diagnostic system recited in claim 16, wherein the smart phone is configured to receive symptomatic user input in response to displaying the plurality of symptomatic questions on the smart phone display screen.

18. The automotive diagnostic system recited in claim 17, wherein the smart phone is configured to upload the symptomatic user input to the remote diagnostic center.

19. The automotive diagnostic system recited in claim 17, wherein the computer readable instructions configure the smart phone to assign a diagnostic mode button and an emergency mode button, such that when the diagnostic mode button is activated by the user, the smart phone enters the diagnostic mode, and when the emergency mode button is activated by the user, the second initiation signal is generated.

20. The automotive diagnostic system recited in claim 15, wherein the computer readable instructions further configure the smart phone to operative in a vehicle control mode, wherein actuation of the first button generates a command signal to be sent to the vehicle for controlling a vehicle system, and wherein actuation of the second button establishes communication with a remote customer service center.

21. An automotive diagnostic system for use with a remote diagnostic center, a smart phone and a vehicle, the smart phone being capable of operating independent of the vehicle, the vehicle having an onboard computer which generates and stores vehicle data including at least one diagnostic trouble code (DTC) generated in response to a problematic operating condition and an accident indicator generated in response to a vehicle accident event, the automotive diagnostic system comprising:
- a data storage unit plug connectable with the onboard vehicle computer for retrieving vehicle data from the onboard vehicle computer and storing the vehicle data, the data storage unit being configured to analyze the retrieved vehicle data on the data storage unit and generate a first emergency initiation signal in response to receipt of the accident indicator;
- a communications module disposable in operable communication with the smart phone to configure the smart phone to communicate with the data storage unit, and the remote diagnostic center;
- a user input module disposable in operable communication with the smart phone to configure the smart phone to receive a second emergency initiation signal from the user;
- a symptomatic questioning module disposable in operable communication with the smart phone to configure the smart phone to display a symptomatic question sequence; and
- an operations module disposable in operable communication with the smart phone to configure the smart phone to operate in a diagnostic mode and an emergency mode;

in the diagnostic mode, the smart phone uploads vehicle data to the remote diagnostic center in response to the vehicle data including at least one DTC, and initiates the symptomatic question sequence for the user in response to the vehicle data not including at least one DTC;

in the emergency mode, the smart phone uploads vehicle data to the remote diagnostic center automatically in response to receipt of one of the first and second emergency initiation signals; and wherein the symptomatic question sequence for the user in the diagnostic mode comprises a plurality of closed-ended questions presented in a multiple choice format, and wherein the multiple choice answers further include follow up questions, and wherein the questions are selected from at least three questions to formulate a diagnostic of the group consisting of:
1. what appears to be the nature of the problem?
   a) mechanical; or
   b) electrical
2. what type of symptom(s) are you experiencing?
   a) irregular smell;
   b) irregular sound;
   c) irregular sight, smoke; or
   d) irregular feel, vibration
3. where is the irregular sound coming from?
   a) front-driver's side;
   b) front-passenger's side;
   c) rear-driver's side or
   d) rear-passenger's side
4. When do you hear the sound?
   a) when the car is parked; or
   b) when the car is moving and
5. Does the sound occur when you press the brake?
   a) yes; or
   b) no.

22. The automotive diagnostic system recited in claim 15, wherein the symptomatic question sequence includes a plurality symptomatic questions displayed on the smart phone display screen.

23. The automotive diagnostic system recited in claim 22, wherein the smart phone is configured to receive symptomatic user input in response to displaying the plurality of symptomatic questions on the smart phone display screen.

24. The automotive diagnostic system recited in claim 23, wherein the smart phone is configured to upload the symptomatic user input to the remote diagnostic center.

25. The automotive diagnostic system recited in claim 1, wherein the accident indicator is representative of a SRS signal generated by the vehicle.

26. The automotive diagnostic system recited in claim 1, wherein:
   the smart phone uploads vehicle data to the remote diagnostic center, independent of user input, in response to the vehicle data including at least one DTC; and
   the smart phone initiates a symptomatic question sequence, independent of user input, in response to the vehicle data not including at least one DTC.

* * * * *